No. 732,377. PATENTED JUNE 30, 1903.
H. ROWNTREE.
ELECTRICAL MOTOR.
APPLICATION FILED NOV. 15, 1899.
NO MODEL. 5 SHEETS—SHEET 3.
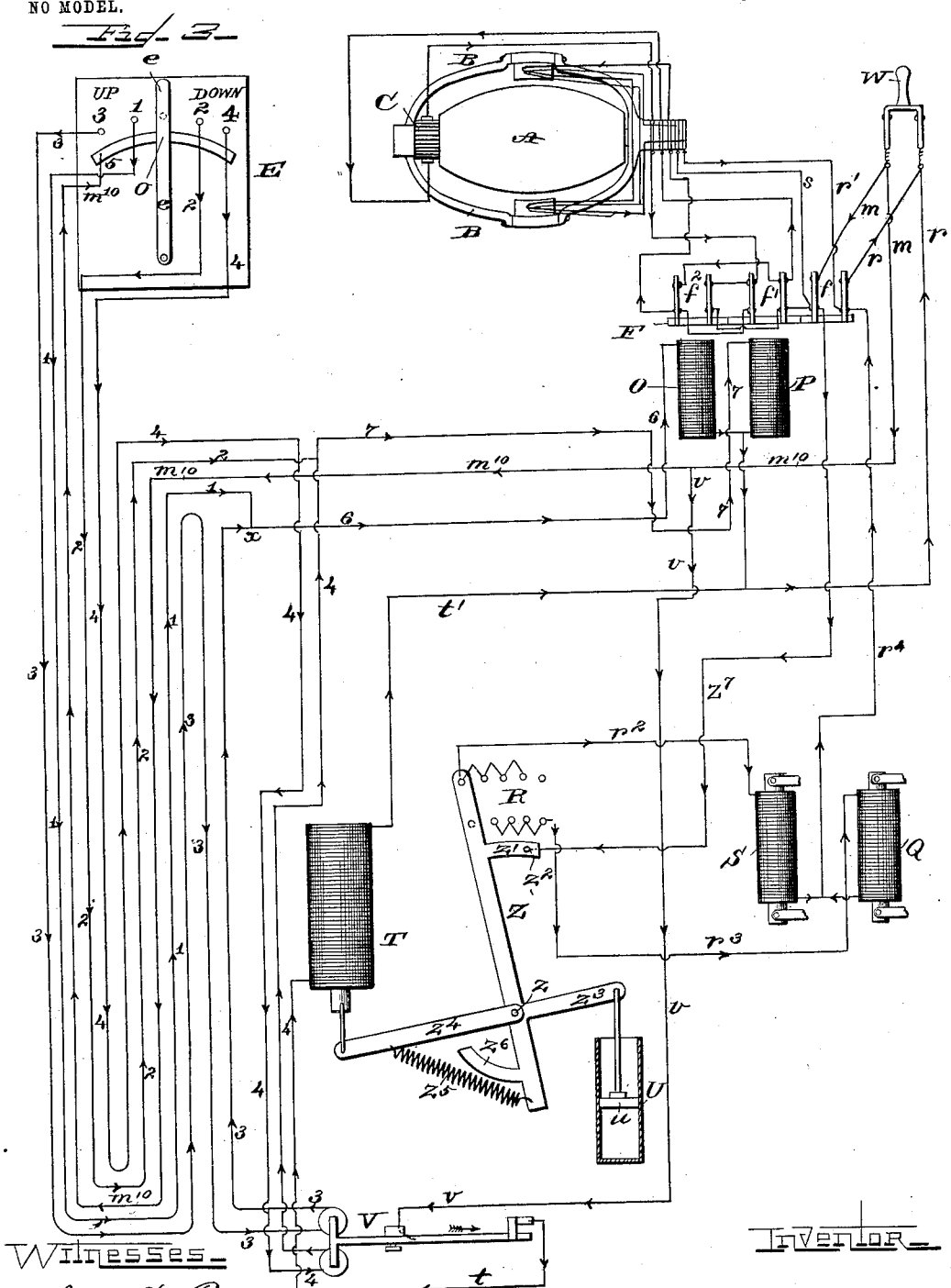
Witnesses
Ira D. Perry.
J. B. Weir.
Inventor
Harold Rowntree
By Charles S. Hill
Atty No. 732,377. PATENTED JUNE 30, 1903.
H. ROWNTREE.
ELECTRICAL MOTOR.
APPLICATION FILED NOV. 15, 1899.
NO MODEL. 5 SHEETS—SHEET 4.
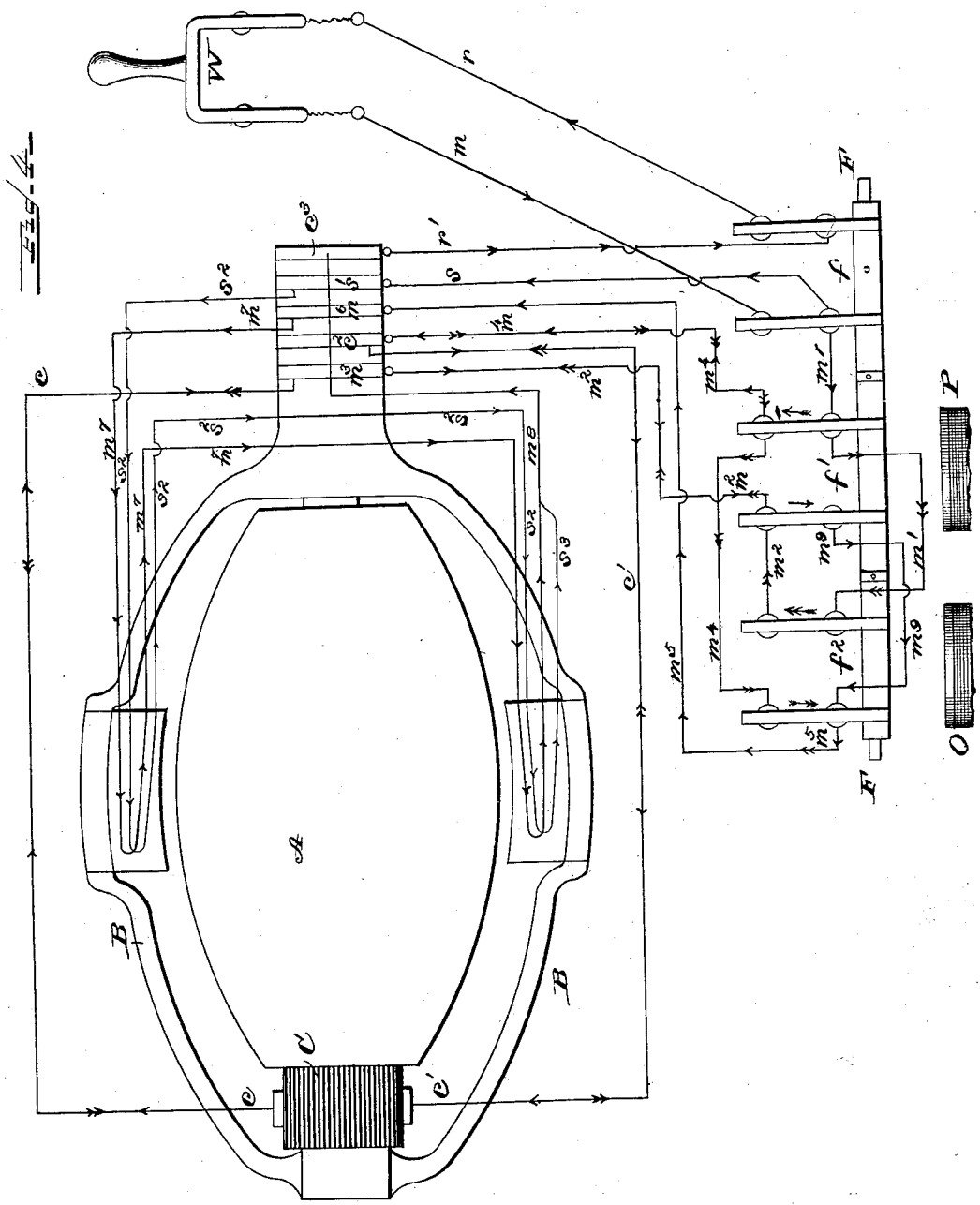
Witnesses
JB Weir
G. A. Rauberschmitt
Inventor
Harold Rowntree
By Charles S. Hill
Atty

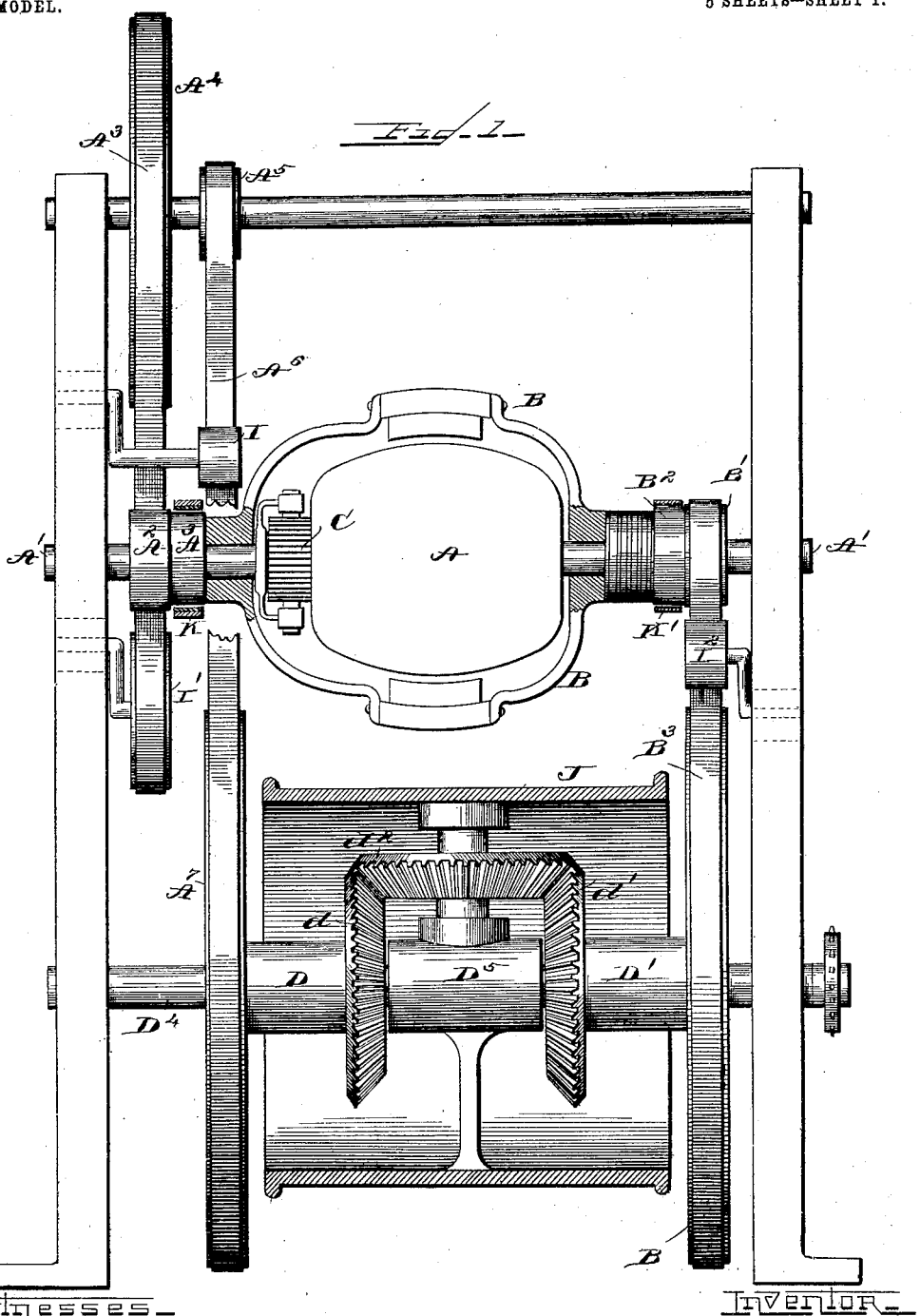

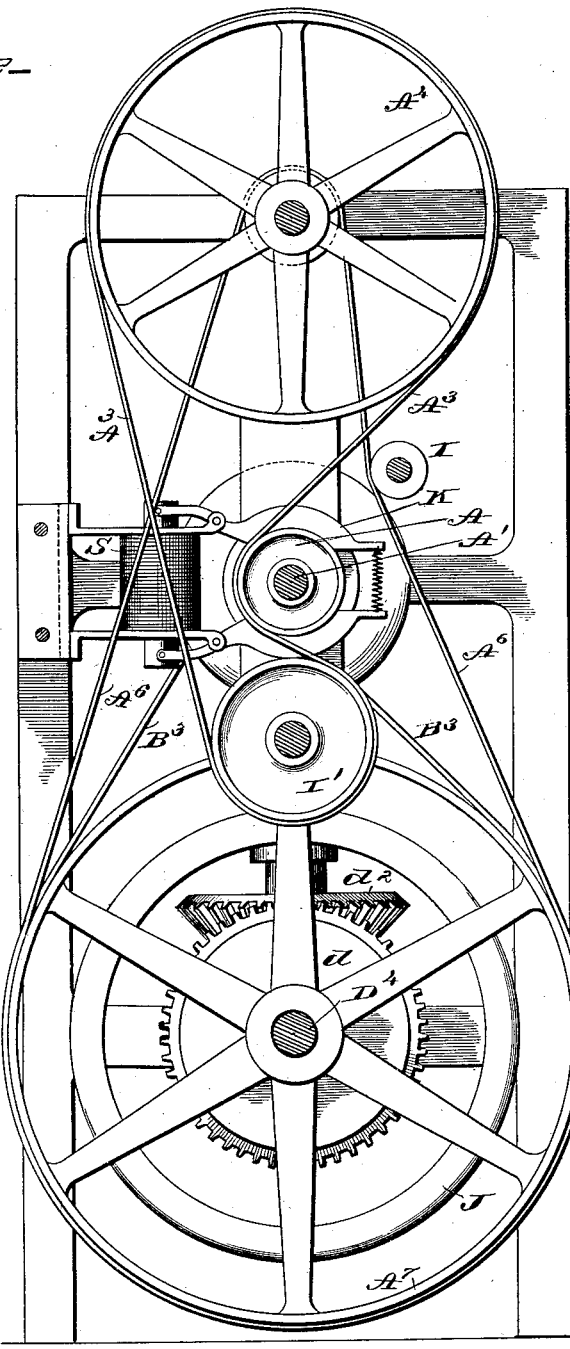

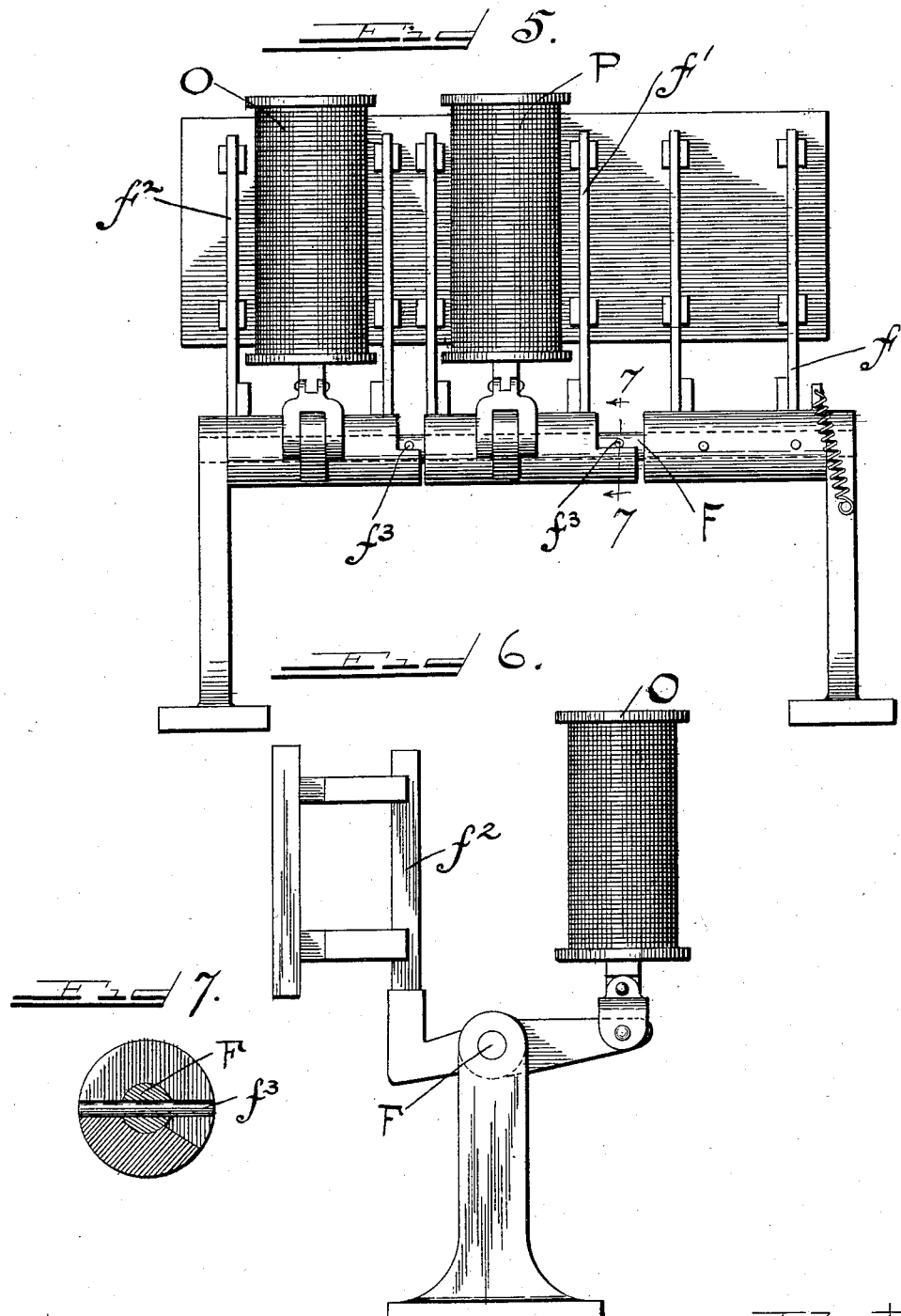

No. 732,377. Patented June 30, 1903.

UNITED STATES PATENT OFFICE.

HAROLD ROWNTREE, OF CHICAGO, ILLINOIS, ASSIGNOR TO BURDETT-ROWNTREE MANUFACTURING COMPANY, OF CHICAGO, ILLINOIS, A CORPORATION OF ILLINOIS.

ELECTRICAL MOTOR.

SPECIFICATION forming part of Letters Patent No. 732,377, dated June 30, 1903.

Application filed November 15, 1899. Serial No. 737,095. (No model.)

*To all whom it may concern:*

Be it known that I, HAROLD ROWNTREE, a citizen of the United States, residing at Chicago, in the county of Cook and State of Illinois, have invented certain new and useful Improvements in Electrical Motors, of which the following is a specification.

Referring to the accompanying drawings, wherein like reference-letters indicate the same or corresponding parts, Figure 1 is a vertical elevation, partly in section, of my improved electric motor combined with a hoisting-drum. Fig. 2 is a side elevation of the same. Fig. 3 is a diagram of said motor, showing the brake and circuit connections adapted to elevator uses. Fig. 4 is an enlarged diagram of said motor and its operating-circuits. Fig. 5 is a front elevation of the switches $f$ $f'$ $f^2$ and the solenoids controlling the same. Fig. 6 is a side elevation of a portion of the parts shown in Fig. 5. Fig. 7 is a vertical section of a portion of the parts shown in Fig. 5, taken on the line 7 7 thereof and viewed in the direction indicated by the arrows on said figure.

The principal invention herein described consists in a hoisting mechanism controlled by an electric motor, which motor in operating the hoisting mechanism to lift a given weight may be run at a high or slow speed. The object of this part of the invention is to enable the speed of the mechanism driven by the motor to be regulated, varied, and controlled more satisfactorily than heretofore.

In order to illustrate one of the useful purposes to which this improved motor may be applied, I have shown it in combination with the hoisting-drum of an electric elevator and with means for regulating the speed of the drum and directing the electric currents through the motor and the speed-regulating devices.

In the drawings, which illustrate the preferred form of embodiment, the armature A and commutator C are fixed to a shaft A', upon which is loosely mounted the field B. Suitable circuit connections, one of which will be hereinafter described, cause the armature and field to be simultaneously revolved in opposite directions. Upon the shaft A' is fixed a brake-disk $A^3$, and upon the field is fixed a similar brake-disk $B^2$. A spring-brake K, automatically controlled by the current, as hereinafter described, operates in connection with the brake-disk $A^3$ to retard or stop the motion of the armature when desired. A similar brake K' operates in connection with the brake-disk $B^2$ on the field to retard or stop the motion of the field when desired. By the operation of the electric currents and of these brakes the armature and field can be separately revolved in either direction or the armature and field can be simultaneously revolved in opposite directions.

The invention above described is particularly useful in connection with electric elevators, as by means of it the elevator-car can be controlled more satisfactorily than by the electric devices heretofore employed and can be stopped accurately at any given point, whether the construction of the elevator-controlling mechanism be such that the point of stoppage may be predetermined and the car automatically arrested at such point independently of the will of the attendant in the car or whether the old-fashioned construction be employed, by which the point of stoppage is determined by the attendant in the car and the car brought to rest as near that point as his judgment and skill can accomplish.

The advantages of the entire invention can be best explained by describing its use in connection with elevator service and with the means that I have combined with it for the control of such service.

In order to enable the elevator-car under all the diverse conditions of varying load and speed of movement to be brought to a stop with accuracy at the point desired, it is necessary as a preliminary step that means be provided for insuring to the car under all circumstances a substantially constant and uniform speed and power of movement when approaching such point and that means be also provided for enabling the brakes to effect a predetermined and substantially uniform resistance when applied to stop the car at such point. These preliminary conditions being established, it is obvious that if the brakes be properly applied the car will stop exactly at the point where it is desired to bring it to rest. In applying my invention to such service I employ a hoisting-drum J, so connected by belting or gearing to the armature and field that both will tend to rotate it in the same direction; but I arrange the gearing or belting in such a manner that the armature and field will drive the hoisting-drum at relatively different speeds, one of them tending to drive it much faster than the other. It is entirely immaterial which is arranged to give it the higher speed; but for purposes of illustration I have shown an arrangement of belting or gearing by which the field drives the drum much faster than does the armature. The illustrated means by which this is accomplished consist of a belt-driving pulley $A^2$, fixed to the armature-shaft and operating a belt $A^3$, which by means of the pulleys $A^4$ $A^5$, belt $A^6$, and pulley $A^7$ reduces the speed ultimately applied from the armature to the tubular shaft D. To the field is affixed a belt-pulley B', carrying a belt $B^3$, which by means of the pulley $B^4$ applies the power of the field with a much smaller reduction of speed to the tubular shaft D'. The shafts D and D' are loosely mounted upon a shaft $D^4$ and have affixed to their inner ends, respectively, two bevel gear-wheels $d$ $d'$. The hub $D^5$ of the hoisting-drum J is mounted and keyed on the shaft $D^4$, between the gear-wheels $d$ $d'$, and is connected to the drum by stout spokes, one of which is adapted to serve as a bearing for the intermediate bevel gear-wheel $d^2$, which is loosely mounted thereon and intermeshes with the wheels $d$ $d'$ in the manner of the ordinary "compensating gear." In the particular form of arrangement illustrated if the armature-brake K be closed, so as to stop the shaft A', and the field-brake K' be open the field-power will run the car at high speed, and if the field-brake be closed, so as to stop the pulley B' when the armature-brake is open, the armature will run the car at a low speed. I I' $I^2$ are idlers, acting in connection with the belts. The electric connections are such that the operator or driver in the car E, Fig. 3, can by the operation of a switch $e$ direct the current properly to the armature, field, and brakes to accomplish any of the effects desired. In starting the car, ordinarily the current is directed into the armature and field to start the motor into operation, and at the same time and by the same movement it is directed into the brake-controlling devices, so as to open the brake on the slow-driving part of the motor without disturbing the other brake already set. The car will therefore start slowly, and as soon as it has attained the maximum slow speed given by the armature when acting alone the car-switch may be shifted to its outer contact-point to gradually open the field-brake and close the armature-brake, thereby utilizing the field to run the car at maximum high speed. At the proper time before the car reaches the desired stopping-place the operator reverses the car-switch, thereby cutting the current out of the devices controlling the field and the operation of the hoisting mechanism connected with the field and cutting it into the devices controlling the operation of the armature and the hoisting mechanism connected therewith, the field and armature remaining energized. When the desired stopping-place is reached, the operator snaps the current out of the motor, whereupon both brakes will be automatically applied. The car which when driven by the fast-driving part of the motor may be traveling at from five hundred to one thousand feet per minute will when driven by the slow-driving part of the motor run at a much lower speed—say from fifty to one hundred feet per minute. The motor, which is strong enough to lift the load at high speed and correspondingly low power, will easily lift the same load at low speed and higher power, and therefore the heaviest load which may be placed in the car will be but a small load for the motor when operating at the reduced speed. At the instant, therefore, that the current is snapped out of the motor, as above described, the car will be traveling at a practically constant and uniform low speed, regardless of the load, and the motor under the action of the brake will therefore make a definite number of revolutions before coming to rest, during which revolutions the speed will reduce gradually and smoothly till the car stops at the exact point desired whether the load be light or heavy. This feature of reducing the car to a uniform slow speed independent of the load as a preliminary to the stopping will be particularly valuable in elevators adapted to be automatically stopped at a predetermined point.

Any form and arrangement of electric controlling devices and circuits may be employed which will accomplish the desired results above indicated. The construction and arrangement of these devices and circuits may be safely left to the skill of the electrician who superintends the erection of the plant, and probably needs no description here; but the diagrammatic sketch shown in Fig. 3, which represents a motor controlled by the attendant on the elevator-car, will illustrate one form which may be employed. In this sketch, O and P are solenoids for directing and reversing the main current, and thereby raising or lowering the car; Q, a solenoid controlling the field-brake K'; S, a solenoid controlling the armature-brake K; R, a rheostat controlling the resistance to the brake-currents and operated by the solenoid T and dash-pot U; V, an electric switch automatically operated by the current passing through the line, and W a manually-operated switch in the main station, which throws the entire apparatus into or out of connection with the prime source of electrical energy. The brakes are applied by means of their springs $k$ and are held out of operation by their respective solenoids Q S when the latter are in action.

The operating-circuits may be arranged as follows: F is a rock-bar upon which are mounted three automatic switches, (marked $f$ $f'$ $f^2$,) each having an arm for the main and one for the return circuits. The switch $f$ is fast to the rock-bar and rocks with it, while the switches $f'$ and $f^2$ are loosely mounted on the rock-bar and adapted, by means of a recess and collar or lug $f^3$, Fig. 5, to rock the bar, and thereby close the switch $f$ whenever either of them moves to close its circuit. The main switch W is directly connected to the automatic switch $f$ by the main and return wires $m$ $r$. $s$ is a shunt, and $r'$ a return-wire, connecting by the switch $f$ to the main and return wires $m$ $r$. The switches $f^2$ $f'$ are separately operated by their respective solenoids O P. Of course the question whether the car will be lifted or lowered by the action of the solenoid O or P will depend upon the direction in which the lifting-cables are wound upon the hoisting-drum J.

By reference to the enlarged drawing, Fig. 4, the action of the operating-currents will be readily understood. Assuming, for example, that the main switch W has been closed and the car-switch $e$, Fig. 3, operated so as to energize the solenoid O, the latter will close the switch $f^2$, which in turn by acting against the lug $f^3$ on the rock-shaft will close the switch $f$, putting the commutator and field of the motor into serial communication with the main line, as follows: The main current will pass from wire $m$ through switch $f$ to wire $m'$, thence to one arm of switch $f^2$, thence by wire $m^2$ to contact-surface $m^3$, thence by wire $c$ to the commutator, thence by wire $c'$ to contact-surface $c^2$, thence by wire $m^4$ to the other arm of switch $f^2$, thence by wire $m^5$ to contact-surface $m^6$, thence by wire $m^7$ to the series winding of the field, thence by wire $m^8$ to the contact-surface $c^3$, and thence by return-wire $r'$ to the main-line return-wire $r$. On the other hand, assuming the car-switch $e$ to have been operated so as to energize the other solenoid P, the action will be as follows: The main current will pass from wire $m$ through switch $f$, thence by wire $m'$ to the near arm of switch $f'$, thence (toward the right in the drawings) by wire $m^4$ to contact-surface $c^2$, thence by wire $c'$ to the commutator, thence by wire $c$ to contact-surface $m^3$, thence by wire $m^2$ to the other arm of the switch $f'$, thence by wire $m^9$ to wire $m^5$, thence to contact-surface $m^6$, thence by wire $m^7$ to the series winding of the field, thence by wire $m^8$ to contact-surface $c^3$, and thence to the return-wire $r$, as before. The shunt $s$ will of course be in communication with the small wires of the field by means of the contact-surface $s'$, the wires $s^2$ $s^3$ $m^3$, surface $c^3$, and return-wires $r'$ $r$.

I will now describe the arrangement and operation of the controlling-circuits governed directly by the manual switch $e$ in the elevator-car E, as indicated in the diagrammatic drawing Fig. 3, or, if preferred, governed by a manual or automatic switch arranged in any other suitable place. Referring to Fig. 3, when the main switch W is closed it puts the main current on wire $m$ into communication through wire $m^{10}$ with the switchboard in the car E. Then when the switch $e$ is turned by the operator to contact-point 1 a current is thereby sent through wires 1 and 6 of the controlling-circuit to solenoid O, and thence to return-wire $r$, causing the latter to operate the switches $f^2$ $f$ in the manner and with the results already described. When, on the other hand, the switch $e$ is turned to contact-point 2, it sends a current through wires 2 and 7 to the solenoid P, causing it to operate the switches $f'$ $f$, as above described, and thereby to reverse the movement of the car.

It will be observed that when the main switch W is closed the main wire $m$ is, by the wires $m^{10}$ $v$, in constant communication with the automatic switch V. It will also be observed that the switch V when operated puts the current from the wire $v$ into communication with a wire $t$, leading to the solenoid T, whence it passes by a wire $t'$ to the return-wire $r$. Now when the car-switch is moved to point 3 the current will go through wires 3 to the electromagnet of switch V, thence through the continuation of wire 3 to wire 6, and thence to the solenoid O, and when switch $e$ is moved to point 4 the current will go through wires 4 to said electromagnet, thence through the continuation of wire 4 to wire 7, and thence to the solenoid P. Hence, as will be seen, the movement of the switch $e$ to contacts 1 or 2 will not actuate the switch V, whereas the movement of the switch $e$ to contacts 3 or 4 will send a current through one or the other of the electromagnets of switch V, causing it to permit the current from wire $v$ to go through the solenoid T and throw it into action, as above explained. The solenoid T controls the action of the rheostat in the following manner: Z is a lever, fulcrumed at $z$, provided with an arm $z'$ in constant sliding contact with a contact-point $z^2$ behind it, and also provided with an arm $z^3$, connected to the piston of the dash-pot or air-chamber U. An arm $z^4$, pivoted at $z$, is connected to the core of the solenoid. A spring $z^5$ connects the lever Z and the arm $z^4$, and the lever Z is further provided with an arm $z^6$, which serves as a tappet against which the arm $z^4$ may strike when sufficiently moved. The power of the spring $z^5$ is somewhat greater than the resistance of the air in the dash-pot when the latter is put under light compression by the movement of the piston $u$. The upper end of the lever Z serves as a switch operating in connection with and controlling the action of the rheostat R. The upper line of points on the rheostat, it will be seen, is connected by the wire $r^2$ to the solenoid S, which controls the armature-brake K, and the lower line of said points is connected by the wire $r^3$ to the solenoid Q, which controls the field-brake K'. The contact-point $z^2$ is connected by a wire $z^7$ to the main-line contact of switch $f$. The lever Z is normally in contact with the upper contact-points of the rheostat, which, as already stated, are connected to the armature-brake. The return-line contact of switch $f$ is connected by a wire $r^4$ with the lower end of the solenoids S Q. (In this description I use the words "upper," "lower," "right," and "left" solely with reference to relative positions on the drawings.) When the main switch W is open or when the switch $f$ is open, neither of the solenoids S Q will be energized, and both of the brakes will be held set by their respective springs; but when the main switch W is closed and by the movement of the car-switch $e$ to point 1 or point 2 the solenoid O is brought into action, and the switch $f$ thereby closed, the current passing through wire $z^7$ will go through lever Z to the upper contact-points of the rheostat and thence to solenoid S, thereby releasing the armature-brake without disturbing the field-brake and starting the car slowly by armature power alone. When, however, the car-switch $e$ is given a further movement, so as to contact at points 3 or 4, the current on its way to solenoid O or P will, as already described, operate the switch V and bring the solenoid T into action, which in turn will slowly swing the lever Z to the right, bringing it into contact with both lines of rheostat-points, thereby releasing the field-brake and causing the car to increase its speed. The lever Z will not effect this change of speed abruptly, because the lever itself is slowly pulled into action by the arm $z^4$ and spring $z^5$ against the unyielding resistance of the air or other fluid in the dash-pot. Finally as the lever Z reaches the extreme limit of its movement to the right it passes out of contact with the upper points of the rheostat, applying the armature-brake again, but still holding the field-brake released and the car running at high speed.

In stopping the elevator the lever of the car-switch can either be first moved to the intermediate position to slow down the speed and thereafter moved to the center position to stop the car, or it can be moved to the center position instantly and the car stopped immediately. In the former case the movement of the lever of the car-switch to the intermediate position short-circuits the current around the switch controlling the brake-rheostat solenoid, and the rheostat-arm therefore returns to its normal position, and so causes the brake of the fast-moving portion of the motor to be applied and the brake of the slow-moving portion released, thereby slowing down the speed of the car. Upon moving the lever in the car to the center all circuits are broken, as will be readily understood, and both brakes are applied, thereby inmediately stopping the car.

It is obvious that in place of the belting and pulleys shown in Fig. 1 gear-wheels may be employed to accomplish the same results, that instead of the drum J the armature and field may be connected in any suitable manner to an endless cable, screw, or other suitable hoisting device, that the motor may be wired either as a shunt, series, or compound motor or wired in any of the many ways in which motors are wired, that the control of the motor from the car may be effected by any suitable means, and it is further obvious that the number, size, and form of the parts composing the device may be greatly varied without departing from the principle of the invention.

Having thus described my invention, what I claim as new, and desire to secure by Letters Patent, is—

1. An electric motor having its armature and field simultaneously revoluble in opposite directions, in combination with a hoisting mechanism driven faster by one of said parts than by the other, and with means whereby the slow-driving part may be actuated and its brake released without releasing the brake of the fast-driving part, substantially as described.

2. An electric motor having its armature and field simultaneously revoluble in opposite directions, in combination with a hoisting mechanism driven faster by one of said parts than by the other, and with means whereby the fast-driving part may be actuated and its brake released without releasing the brake of the slow-driving part, substantially as described.

3. An electric motor having its armature and field simultaneously revoluble in opposite directions, in combination with means for reversing the revoluble direction of said parts, a hoisting mechanism driven faster by one of said parts than by the other, and means whereby the slow-driving part may be actuated and its brake released without releasing the brake of the fast-driving part, substantially as described.

4. An electric motor having its armature and field simultaneously revoluble in opposite directions, in combination with means for reversing the revoluble direction of said parts, a hoisting mechanism driven faster by one of said parts than by the other, and means whereby the fast-driving part may be actuated and its brake released without releasing the brake of the slow-driving part, substantially as described.

5. An electric motor having its armature and field simultaneously revoluble in opposite directions, in combination with a hoisting mechanism driven faster by one of said parts than by the other, an elevator-car, and means within said car for actuating the slow-driving part and releasing its brake without releasing the brake of the fast-driving part, substantially as described.

6. An electric motor having its armature and field simultaneously revoluble in opposite directions, in combination with a hoisting mechanism driven faster by one of said parts than by the other, an elevator-car, and means within said car for actuating the fast-driving part and releasing its brake without releasing the brake of the slow-driving part, substantially as described.

7. An electric motor having its armature and field simultaneously revoluble in opposite directions, in combination with means for reversing the revoluble direction of said parts, a hoisting mechanism driven faster by one of said parts than by the other, means for actuating the slow-driving part and releasing its brake without releasing the brake of the fast-driving part, an elevator-car, and means within said car for controlling the said slow-driving part and its brake, substantially as described.

8. An electric motor having its armature and field simultaneously revoluble in opposite directions, in combination with means for reversing the revoluble direction of said parts, a hoisting mechanism driven faster by one of said parts than by the other, means for actuating the fast-driving part and releasing its brake without releasing the brake of the slow-driving part, an elevator-car, and means within said car for controlling said fast-driving part and its brake, substantially as described.

9. The combination of an elevator-car, motor-actuated means for moving the car at a high speed, motor-actuated means for moving the car at a slow speed, and controlling means within said car whereby in starting the car the slow-speed motor-actuated means will be first put in operation, substantially as and for the purpose described.

10. The combination of an elevator-car, motor-actuated means for moving the car at a high speed, motor-actuated means for moving the car at a slow speed, and automatic electrically-controlled means for cutting out the high-speed means, and moving the car by the slow-speed means when stopping the car, substantially as described.

11. The combination of an elevator-car, motor-actuated means for moving the car at a high speed, motor-actuated means for moving the car at a slow speed, and automatic electrically-controlled means for cutting out the slow-speed means, and moving the car by the high-speed means, substantially as described.

HAROLD ROWNTREE.

Witnesses:
   CHARLES S. HILL,
   M. A. KENNEDY.